Patented Nov. 12, 1929

1,735,564

UNITED STATES PATENT OFFICE

JOHN J. DOUGHTEN, OF MILLERSTOWN, PENNSYLVANIA

METHOD OF WATERPROOFING LEATHER FOR PACKING AND OTHER PURPOSES

No Drawing.    Application filed December 11, 1928.   Serial No. 325,392.

This invention relates to a method of treating leather for use as a hydraulic packing to make the same a tight packing and at the same time provide a packing that will contain the lubricating element necessary to maintain the packing in a pliable condition and one that will operate in the stuffing boxes of bearings to prevent the leakage of the liquids therethrough.

The primary object of my invention is to provide a packing primarily adapted for use upon bearings where there is a low hydraulic head and where the shafts run at relatively high speeds, as upon the pump shaft of an automobile and the packing of the glands of centrifugal and other forms of pumps wherein the shaft runs at relatively high speeds and wherein the heads are relatively low. I have also obtained satisfactory results wherein my packing has been used on the piston rods of reciprocating hydraulic pumps.

My invention consists first in taking untanned, dressed skins, as of some bovine animal, and the boiling of the hide in oils, as lubricating oils for a period of about one hour, and the taking of the hide thus treated from the boiled oil and the immediate immersing of the same while in a heated condition in a solution of glycerin or other triatomic alcohol, and the curing of the same in glycerin.

I have found best results are obtained where strips are then cut from the hide and braided for wrapping about the shaft before the packing gland is tightened thereupon. Where the shaft is a relatively small shaft, the strips thus cut are made relatively narrow, and where the shaft is large the heavier portions of the skin are used and the same are cut relatively wide. A packing thus prepared will operate over long periods without attention and will maintain a tight packing gland about the shaft.

While the method herein outlined may be successfully carried out as stated, I do not wish to be confined in the carrying out of my method to the specific method outlined, as the result may be accomplished by slight departures from the method without departing from the spirit of the invention, all coming within the scope of the claims which follow:

What I claim is:

1. A method of waterproofing leather for packing and other purposes, consisting in first boiling an untanned dressed skin in oil for a period of approximately sixty minutes and then immersing the same while in a heated condition in glycerin and the curing of the same therein.

2. A method of waterproofing leather for packing and other purposes, consisting in first boiling an untanned dressed skin of a bovine animal in a lubricating oil for a period of approximately sixty minutes and then immersing and curing the hide thus treated in glycerin and the cutting of the hide thus treated in strips and the braiding of the same into suitable form and size for placing about a shaft as packing.

JOHN J. DOUGHTEN.